United States Patent
Shiozawa et al.

(10) Patent No.: US 9,187,090 B2
(45) Date of Patent: Nov. 17, 2015

(54) VEHICLE BODY VIBRATION-DAMPING CONTROL DEVICE

(71) Applicant: Nissan Motor Co., Ltd., Yokohama-shi, Kanagawa (JP)

(72) Inventors: Yuuki Shiozawa, Sagamihara (JP); Shoji Kawaguchi, Machida (JP); Yosuke Kobayashi, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 14/367,671

(22) PCT Filed: Feb. 13, 2013

(86) PCT No.: PCT/JP2013/053403
§ 371 (c)(1),
(2) Date: Jun. 20, 2014

(87) PCT Pub. No.: WO2013/122104
PCT Pub. Date: Aug. 22, 2013

(65) Prior Publication Data
US 2015/0183429 A1    Jul. 2, 2015

(30) Foreign Application Priority Data
Feb. 16, 2012    (JP) .................................. 2012-031645

(51) Int. Cl.
*G06F 17/00* (2006.01)
*B60G 17/02* (2006.01)
(Continued)

(52) U.S. Cl.
CPC ............. *B60W 30/045* (2013.01); *B60W 10/06* (2013.01); *B60W 10/22* (2013.01); *B60W 30/04* (2013.01);
(Continued)

(58) Field of Classification Search
CPC .............. Y02T 10/7258; Y02T 10/642; B60L 2240/423; B60L 2270/145; B60L 3/102; G01M 17/007; G01M 7/02; B60W 10/06; B60W 30/04; B60W 30/045; B60W 40/10; B60W 50/0097; B60W 50/0098; B60W 30/18; B60W 2030/041; B60W 10/04; B60W 2050/0012; B60W 2720/16
USPC ............... 701/70, 48, 31.4, 36, 38, 29.2, 102, 701/104, 96; 280/5.507, 5.502, 5.515
See application file for complete search history.

(56) References Cited

U.S. PATENT DOCUMENTS

2006/0109051 A1* 5/2006 Daio .............................. 330/84
2011/0213527 A1* 9/2011 Itabashi et al. .................. 701/37

FOREIGN PATENT DOCUMENTS

CN          01094651     * 11/1994
JP       2006-69472 A      3/2006
(Continued)

*Primary Examiner* — Muhammad Shafi
(74) *Attorney, Agent, or Firm* — Global IP Counselors, LLP

(57) ABSTRACT

An object of the vehicle body vibration-damping control device according to the present invention is to achieve a targeted effect for damping the vehicle body vibration regardless of the responsiveness of an actuator for controlling the drive torque.
The vehicle body vibration-damping control device has a body vibration estimating unit (205) for estimating a sprung mass behavior of a vehicle body based on input information during travel, and a torque command-value computing unit (206) for computing a correction torque value for correcting a drive torque command value applied to an engine (106) when the sprung mass behavior is controlled. The torque command-value computing unit (206) has regulator and tuning units (308, 309, 310) for calculating the correction torque value based on the result of estimating the sprung mass behavior, and a nonlinear gain amplifying unit (313) for amplifying the absolute value of the correction torque when in a region where the positive or negative attribute of the calculated correction torque value is reversed, and using the amplified value to correct the drive torque command value.

12 Claims, 15 Drawing Sheets

(51) Int. Cl.
  *B60W 30/045* (2012.01)
  *B60W 50/00* (2006.01)
  *B60W 30/18* (2012.01)
  *B60W 10/06* (2006.01)
  *B60W 10/22* (2006.01)
  *B60W 30/04* (2006.01)
  *B60W 40/10* (2012.01)
  *B60W 10/04* (2006.01)

(52) U.S. Cl.
  CPC ............... *B60W 30/18* (2013.01); *B60W 40/10* (2013.01); *B60W 50/0097* (2013.01); *B60W 50/0098* (2013.01); *B60W 10/04* (2013.01); *B60W 2030/041* (2013.01); *B60W 2030/043* (2013.01); *B60W 2050/0012* (2013.01); *B60W 2510/22* (2013.01); *B60W 2720/16* (2013.01); *Y02T 10/84* (2013.01)

(56) References Cited

FOREIGN PATENT DOCUMENTS

| JP | 2006-264628 A | 10/2006 |
| JP | 2011-246079 A | 12/2011 |
| JP | 2012-7605 A | 1/2012 |

* cited by examiner

RESTRAINT OF VIBRATION DUE TO F/F DRIVER INPUT

STORAGE OF VIBRATION DUE TO EXTERNAL
DISTURBANCE OF F/B ROAD SURFACE

VEHICLE BODY VIBRATION-DAMPING CONTROL DEVICE

CROSS-REFERENCE TO RELATED APPLICATIONS

This application is a U.S. National stage application of International Application No. PCT/JP2013/053403, filed Feb. 5, 2013, which claims priority to Japanese Patent Application No. 2012-031645 filed in Japan on Feb. 16, 2012. The entire disclosure of Japanese Patent Application No. 2012-031645 is hereby incorporated herein by reference.

BACKGROUND

1. Field of the Invention

The present invention relates to a vehicle body vibration-damping control device for controlling drive torque to restrain the sprung mass behavior of a vehicle body estimated based on input information during travel.

2. Background Information

In the past, a vehicle body vibration-damping control device has been known in which drive torque is controlled to correct the drive torque so as to stabilize sprung mass behavior (e.g., refer to Japanese Laid-Open Patent Application No. 2006-264628).

SUMMARY

This conventional vehicle body vibration-damping control device, however, has a structure in which the command value of a drive torque, obtained based on inputted torque and an equation of motion in the pitching direction, is outputted to the drive source without being modified. For this reason, the conventional device has had the problem that the device cannot be expected to have an adequate effect in a vehicle that has low response to control command values, such as an engine-driven vehicle.

The present invention focuses on the above problem, it being an object of the invention to provide a vehicle body vibration-damping control device capable of achieving a targeted effect for damping the vehicle body vibration regardless of the responsiveness of an actuator for controlling the drive torque.

In order to achieve the above objective, the vehicle body vibration-damping control device of the present invention is premised on providing a body vibration estimating unit for estimating a sprung mass behavior of a vehicle body based on input information during travel, and a torque command-value computing unit for computing a correction torque value for correcting a drive torque command value applied to an actuator when the sprung mass behavior is controlled. In this vehicle body vibration-damping control device, the torque command-value computing unit has a correction torque-value calculating unit for calculating a correction torque value based on the result of estimating the sprung mass behavior, and a correction torque-value amplifying unit for amplifying the absolute value of the correction torque when in a region where the positive or negative attribute of the calculated correction torque value is reversed, and using the amplified value to correct the drive torque command value.

Thus, when in a region where the positive or negative attribute of the correction torque value calculated based on the result of estimating the sprung mass behavior is reversed, the drive torque command value is corrected by amplifying the absolute value of the correction torque and applying the amplified value to the actuator.

Specifically, a region where the positive or negative attribute of the correction torque value is reversed is a region where the actuator response is delayed, or a dead zone region. Taking note of this region and amplifying the absolute value of the correction torque in the region where the positive or negative attribute is reversed—that is, increasing the amount of correction for either a plus or minus correction torque value—expands the operation region where the actuator operates with respect to the applied drive torque command value. This has the effect of decreasing the non-operation region of the actuator in association with this expansion of the operation region of the actuator, and increasing the actual drive torque response to the drive torque command value applied to the actuator.

As a result, a targeted effect for damping the vehicle body vibration can be achieved regardless of the responsiveness of an actuator for controlling the drive torque.

BRIEF DESCRIPTION OF THE DRAWINGS

Referring now to the attached drawings which form a part of this original disclosure.

DETAILED DESCRIPTION OF THE EMBODIMENTS

Figure 1:
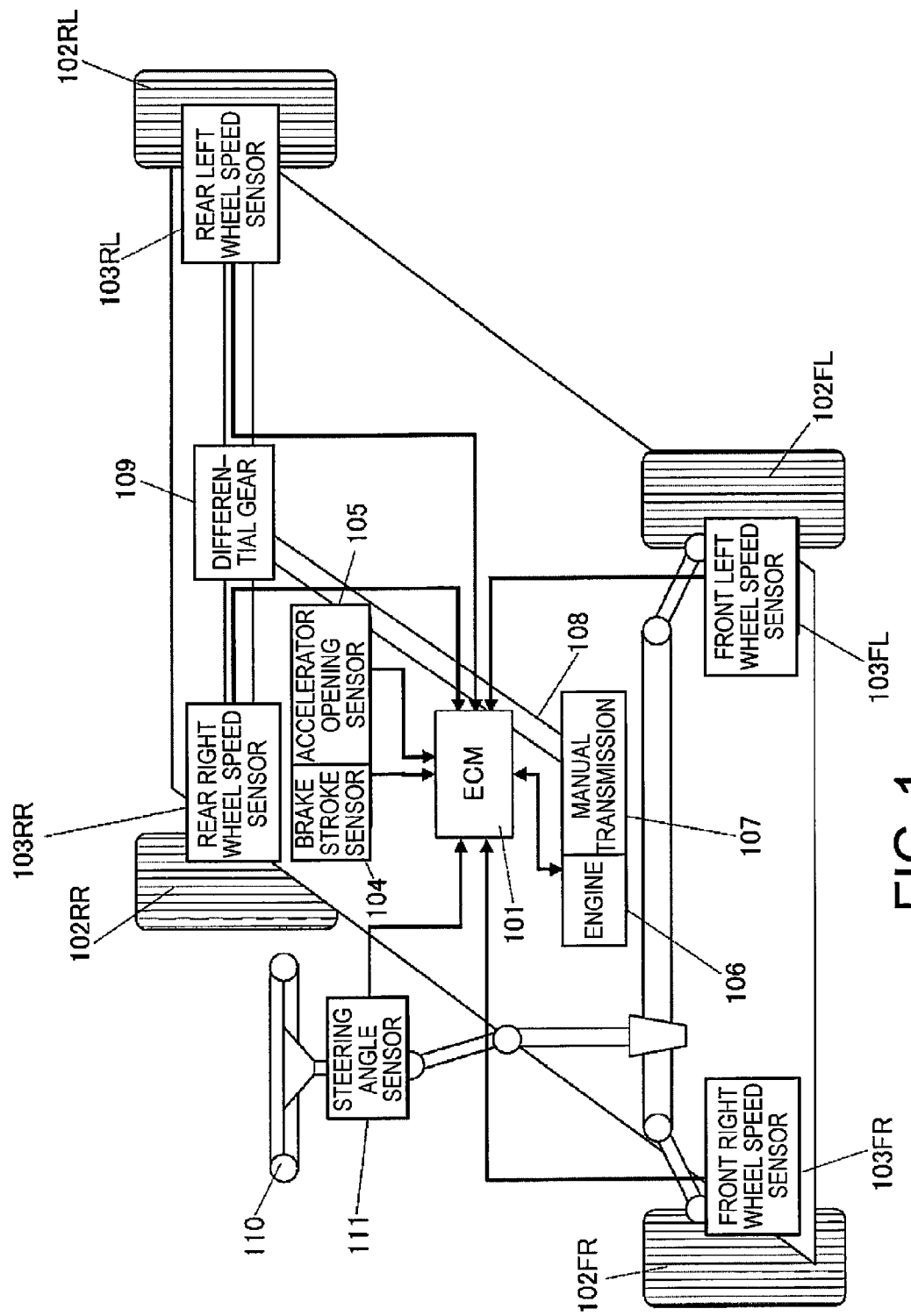
FIG. 1 is a schematic block diagram of the overall system of an engine-driven vehicle to which the vehicle body vibration-damping control device of Example 1 is applied.

A preferred embodiment of the vehicle body vibration-damping control device of the present invention will be described hereinafter based on Example 1 shown in the drawings.

Example 1

First, the configuration will be described. The configuration in Example 1 will be described divided into "Overall system configuration," "Internal configuration of engine control module," "Configuration of input converting unit of vehicle body vibration-damping control device," "Configuration of body vibration estimating unit of vehicle body vibration-damping control device," and "Configuration of torque command-value computing unit of vehicle body vibration-damping control device."

Overall System Configuration

FIG. 1 is a schematic block diagram of the overall system of an engine-driven vehicle to which the vehicle body vibration-damping control device of Example 1 is applied. The overall system configuration will be described hereinafter based on FIG. 1. "Vehicle body vibration-damping control" refers to control having a function for restraining vehicle body vibration by optimally controlling the drive torque produced by the actuator of a vehicle (in Example 1, an engine 106) in conjunction with damping the vibration of the vehicle body. The vehicle body vibration-damping control of Example 1 obtains combined effects of improving yaw response during steering, improving linearity during steering, and restraining roll behavior.

As shown in FIG. 1, the engine-driven vehicle to which the vehicle body vibration-damping control device of Example 1 is applied is a rear-wheel-drive vehicle using manual transmission, and has an engine control module (ECM) 101 and an engine 106.

The engine control module 101 (hereafter called "ECM 101") controls the drive torque of the engine 106. The ECM 101 receives as inputs signals from wheel speed sensors 103FR, 103FL, 103RR, and 103RL connected to left and right front wheels 102FR and 102FL (idler wheels) and left and right rear wheels 102RR and 102RL (drive wheels), and a signal from a steering angle sensor 111 connected to a steering wheel 110. Also inputted are a signal from a brake stroke sensor 104 for detecting the degree of driver operation of a brake pedal, and a signal from an accelerator opening sensor 105 for detecting the degree of driver operation of an accelerator pedal. A torque command value for driving the engine 106 is computed according to these input signals, and the torque command value is sent to the engine 106.

The engine 106 generates a drive torque corresponding to the torque command value from the ECM 101, and the generated drive torque is accelerated or decelerated according to the driver shifting operation using a manual transmission 107. The drive torque shifted in gear by the manual transmission 107 is further shifted in gear by a shaft 108 and a differential gear 109, and transmitted to the left and right rear wheels 102RR and 102RL to drive the vehicle.

Internal Configuration of Engine Control Module

Figure 2:
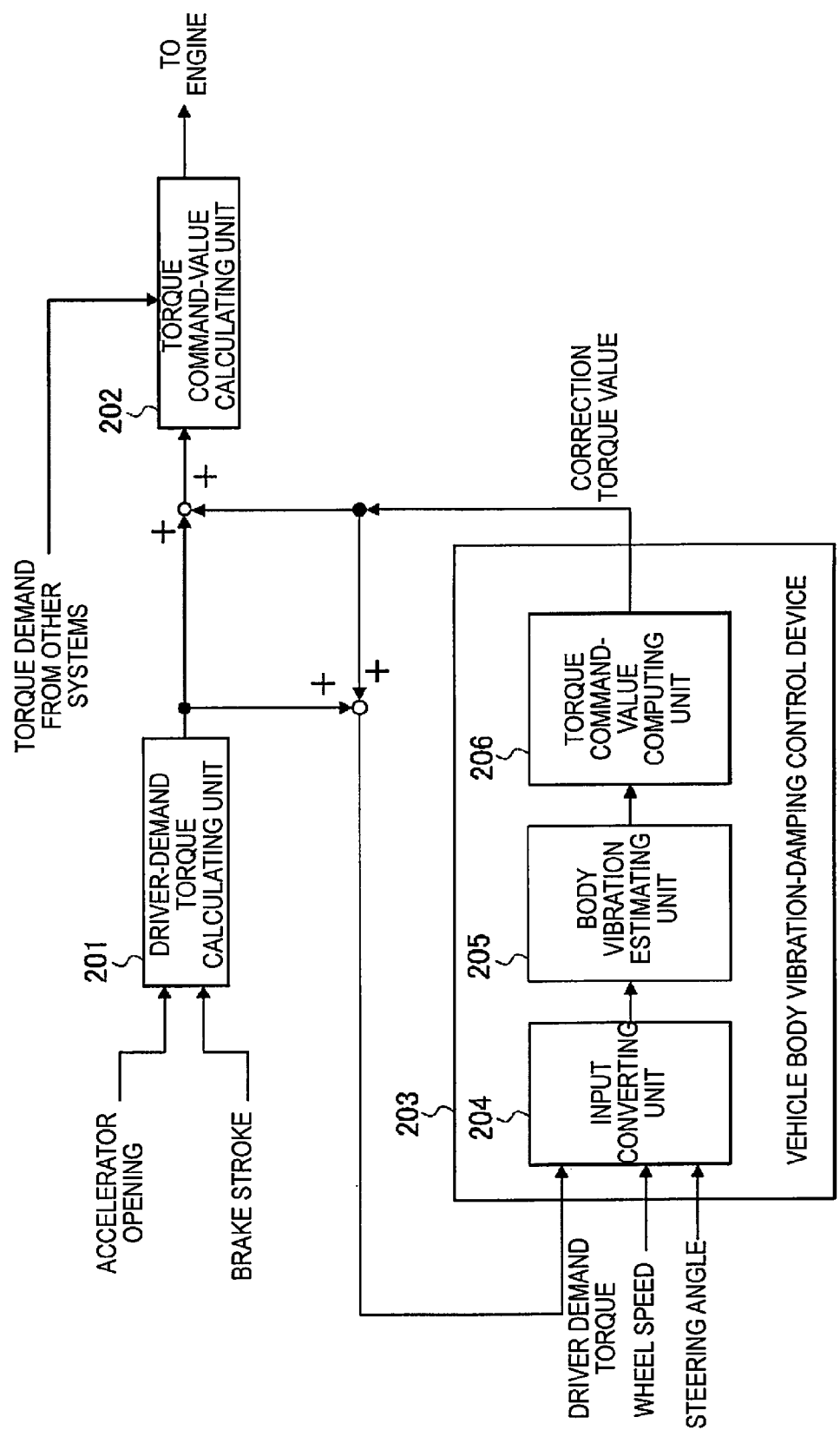
FIG. 2 is a control block diagram showing the configuration of a control program in an engine control module in the engine-driven vehicle system of Example 1.

The vehicle body vibration-damping control device is constituted in the form of a control program in the ECM 101. FIG. 2 shows a control block diagram representing the control program in the ECM 101. The internal configuration of the ECM 101 will be described hereinafter based on FIG. 2.

As shown in FIG. 2, the ECM 101 has a driver-demand torque calculating unit 201, a torque command-value calculating unit 202, and a vehicle body vibration-damping control device 203.

The driver-demand torque calculating unit 201 is inputted information on the degree of brake operation by the driver from the brake stroke sensor 104 and information on the degree of accelerator operation by the driver from the accelerator opening sensor 105, and calculates a driver demand torque.

The torque command-value calculating unit 202 is inputted a torque command, obtained by adding the correction torque value from the vehicle body vibration-damping control device 203 to the driver demand torque, from the driver-demand torque calculating unit 201 and the torque demand from another vehicle-mounted system (for example, a VDC or TCS). The unit then computes the drive torque command value for the engine 106 based on the input information.

The vehicle body vibration-damping control device 203 comprises the three components of an input converting unit 204, a body vibration estimating unit 205, and a torque command-value computing unit 206. The input converting unit 204 is inputted the driver demand torque, the engine speed of revolution, the wheel speed, and the steering angle, and converts these input information to a drive torque, a vertical force from the road surface, and a turning resistance. The body vibration estimating unit 205 inputs the drive torque, the vertical force, and the turning resistance from the input converting unit 204 into a vehicle model to estimate a sprung mass behavior based on the torque input, a sprung mass behavior based on external disturbance, and a sprung mass behavior based on steering. The torque command-value computing unit 206 computes a correction torque value so as to control the sprung mass behavior based on the sprung mass behaviors estimated by the body vibration estimating unit 205.

Figure 3:
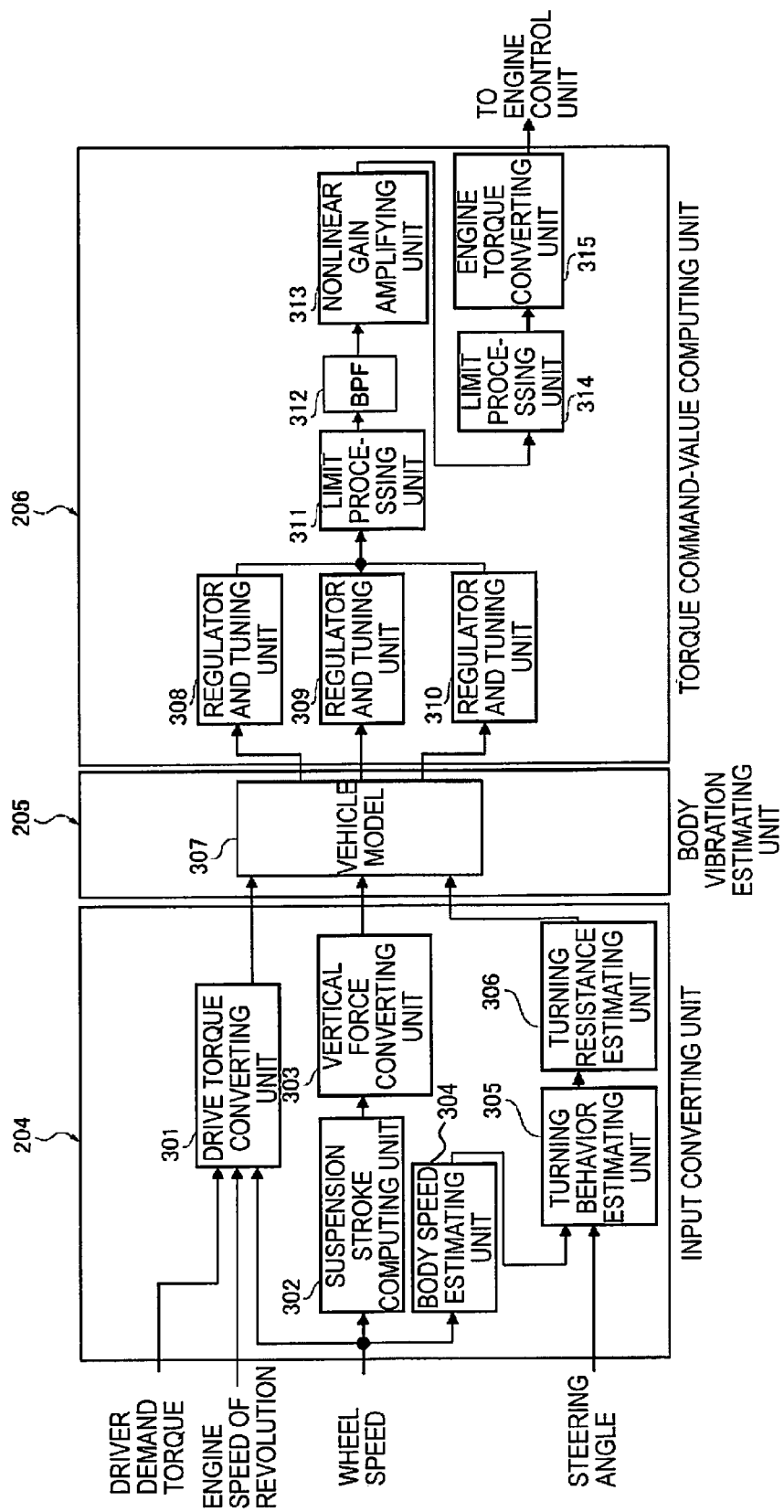
FIG. 3 is a control block diagram showing the vehicle body vibration-damping control device in the engine control module of Example 1.

Configuration of Input Converting Unit of Vehicle Body Vibration-Damping Control Device FIG. 3 shows a block configuration representing the details inside the vehicle body vibration-damping control device 203. Of the three components comprising the vehicle body vibration-damping control device 203, the configuration of the input converting unit 204 will be described hereinafter based on FIGS. 3 to 6.

The input converting unit 204 converts sensing information from the vehicle to the format for inputting to the vehicle model 307 (specifically, a dimension of torque or force acting on the vehicle body), which will later be used by the body vibration estimating unit 205. As shown in FIG. 3, the input converting unit 204 has a drive torque converting unit 301, a suspension stroke computing unit 302, a vertical force converting unit 303, a body speed estimating unit 304, a turning behavior estimating unit 305, and a turning resistance estimating unit 306.

The drive torque converting unit 301 multiplies the driver demand torque by a gear ratio to convert from an engine end torque to a shaft end torque Tw. The gear ratio is computed from the ratio of the wheel speeds (the average left and right speeds of revolution of the drive wheels) to the engine speed of revolution. The gear ratio is the total gear ratio of the manual transmission 107 and the differential gear 109.

Figure 4:
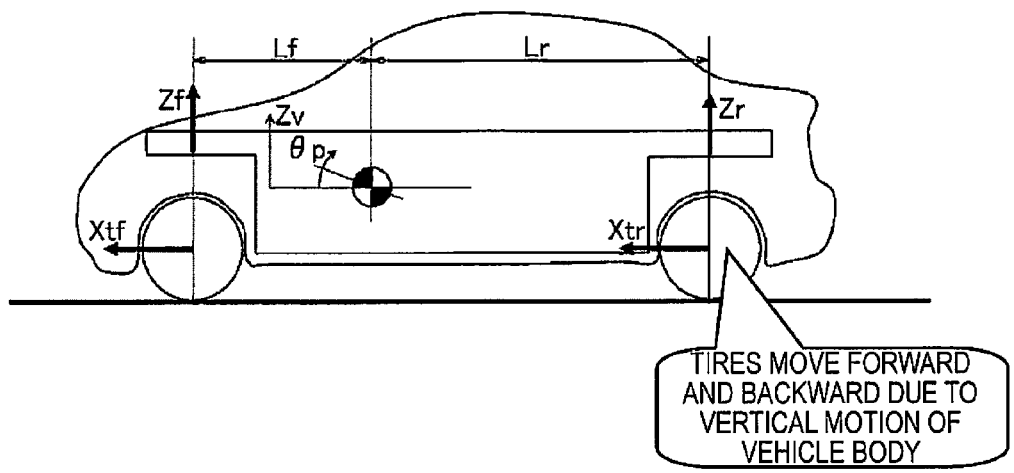
FIG. 4 is a schematic view showing the forward or backward displacement of a tire during a suspension stroke in the description of the suspension stroke computing unit of Example 1.
Figure 5:
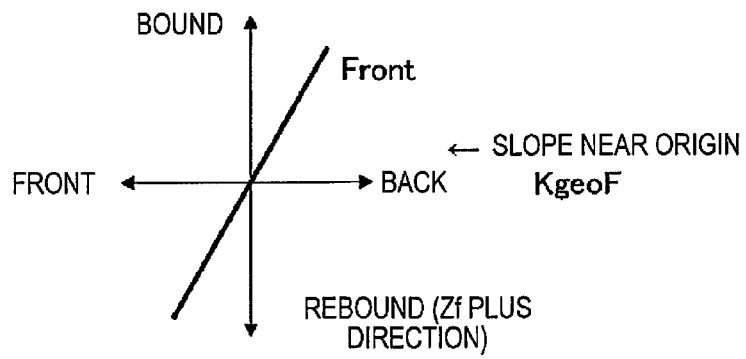
FIG. 5 is a front-tire characteristic diagram showing the forward and backward displacement relation characteristics of the front tires with a suspension stroke in the description of the suspension stroke computing unit of Example 1.
Figure 6:
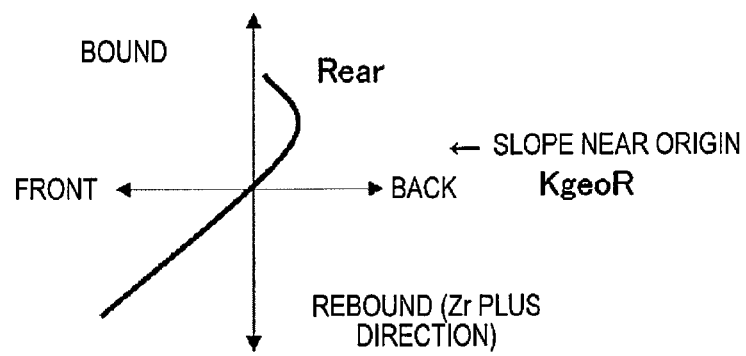
FIG. 6 is a rear-tire characteristic diagram showing the forward and backward displacement relation characteristics of the rear tires with a suspension stroke in the description of the suspension stroke computing unit of Example 1.

The suspension stroke computing unit 302 computes the stroke speed and stroke quantity of the suspension based on the wheel speeds. As shown in FIG. 4, the tires are displaced forward or backward with each stroke of the suspension. This relationship is determined by the geometry of the suspension of the vehicle. FIGS. 5 and 6 show this relationship graphically. If this relationship is linearized and the coefficients of vertical displacement to forward or backward displacement for the back wheels are KgeoF and KgeoR, the vertical displacement Zf and Zr of the front and back wheels are related to the forward or backward displacement of the tires xtf and xtr as follows.

$$Zf = KgeoF \cdot xtf$$

$$Zr = KgeoR \cdot xtr$$

Differentiating these equations gives an equation of the forward or reverse speed and the vertical speed of the tires. Therefore, this relationship may be used to compute the stroke speed and stroke quantity of the suspension.

The vertical force converting unit 303 multiplies a spring coefficient and an attenuation coefficient by the stroke speed and stroke quantity of the suspension computed by the suspension stroke computing unit 302, and adds these together to convert the resulting sums to front- and rear-wheel vertical forces Ff and Fr.

The body speed estimating unit 304 outputs the average wheel speed of the idler wheels 102FR and 102FL from the wheel speed information as the vehicle body speed V.

The turning behavior estimating unit 305 is inputted the vehicle body speed V from the body speed estimating unit 304 and the steering angle from the steering angle sensor 111, computes the tire steering angle δ from the steering angle, and uses a conventional two-wheel turning model equation to compute the yaw rate γ and the body sideslip angle βv.

The turning resistance estimating unit 306 computes front- and rear-wheel slip angles βf and βr (equations below), which are tire sideslip angles, based on the yaw rate γ and the body sideslip angle βv computed by the turning behavior estimating unit 305. The unit also computes cornering forces Fyf and Fyr (tire lateral force) according to the product of the front- and rear-wheel slip angles βf and βr and cornering powers Cpf and Cpr to. The unit then to computes front- and rear-wheel turning resistances Fcf and Fcr according to the product of the front- and rear-wheel slip angles βf and βr and the cornering forces Fyf and Fyr and the rate of change in cornering power.

The front- and rear-wheel slip angles βf and βr may be calculated using the following equations.

$$\beta f = \beta v + Lf \cdot \gamma / V - \delta$$

$$\beta r = \beta v - Lr \cdot \gamma / V$$

where Lf and Lr are the distance from the center of gravity of the vehicle body to the front and rear axles.

Configuration of Body Vibration Estimating Unit of Vehicle Body Vibration-Damping Control Device]

FIG. 3 is a block diagram representing the details inside the vehicle body vibration-damping control device 203. Of the three components comprising the vehicle body vibration-damping control device 203, the configuration of the body vibration estimating unit 205 will be described hereinafter based on FIGS. 3 and 7.

Figure 7:
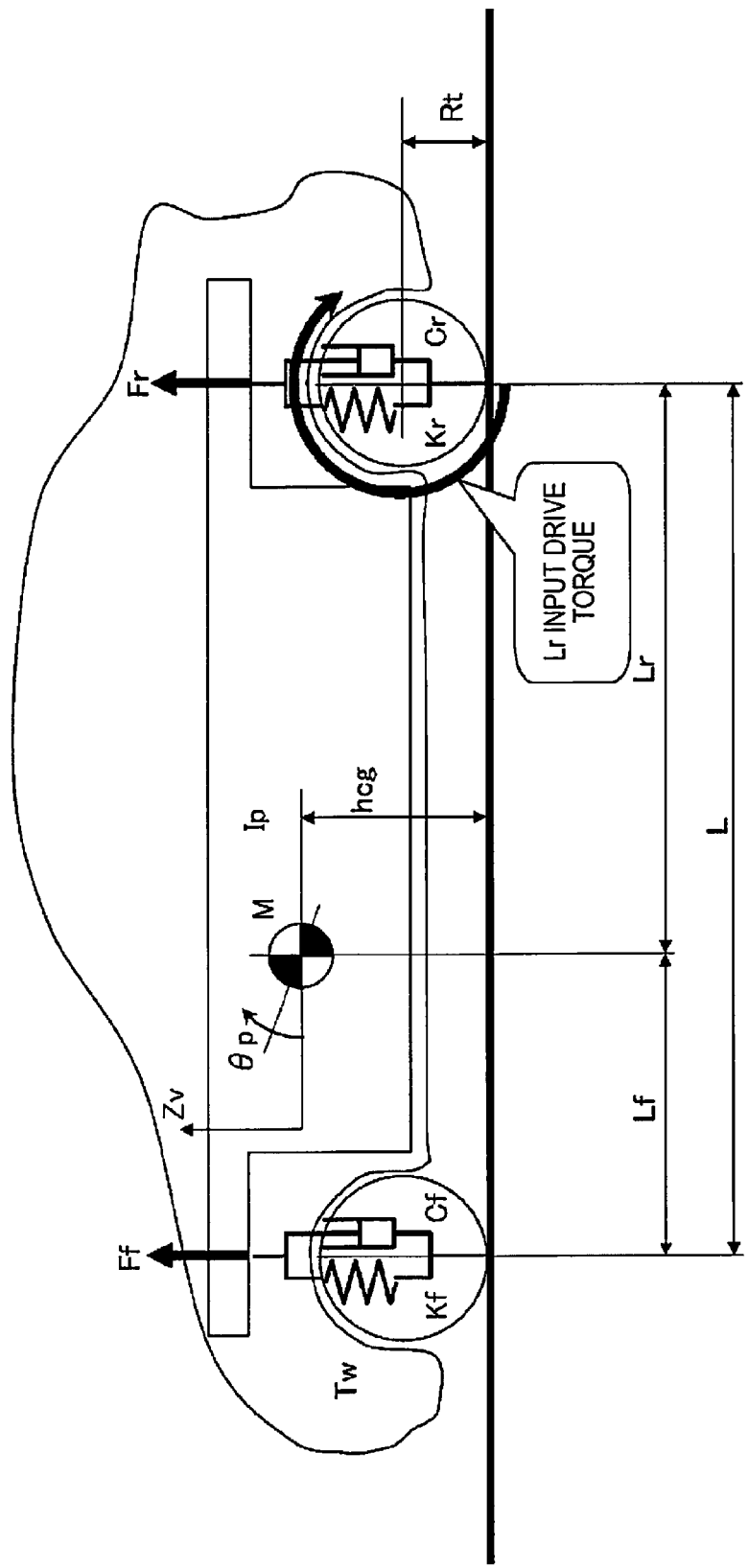
FIG. 7 is a vehicle model diagram schematically showing a vehicle model having the vehicle body vibration-damping control device of Example 1.

As shown in FIG. 7, the body vibration estimating unit 205 has a vehicle model 307. The vehicle model 307 is expressed by a vertical motion equation and a pitching motion equation for modeling the vehicle (including the vehicle body, the front wheel suspension, and the rear wheel suspension) in which the present system is mounted. The shaft end torque Tw, the front- and rear-wheel vertical forces Ff and Fr, and the front- and rear-wheel turning resistances Fcf and Fcr computed by processing in the input converting unit 204 are also inputted to the vehicle model 307 to compute the quantities of state of the sprung mass behavior to be controlled.

The quantities of state of the sprung mass behaviors computed by the body vibration estimating unit 205 (see FIG. 8) are:

Sprung mass behavior based on torque input;
Bounce speed, bounce quantity, pitch speed, pitch angle;
Sprung mass behavior based on external disturbance (wheel speed);
Bounce speed, bounce quantity, pitch speed, pitch angle;
Sprung mass behavior based on steering; and
Bounce speed, bounce quantity, pitch speed, pitch angle.
Configuration of torque command-value computing unit of vehicle body vibration-damping control device FIG. 3 is a block diagram representing the details inside the vehicle body vibration-damping control device 203. Of the three components comprising the vehicle body vibration-damping control device 203, the configuration of the torque command-value computing unit 206 will be described hereinafter based on FIGS. 3 and 8-14.

As shown in FIG. 3, the torque command-value computing unit 206 is provided with regulator and tuning units 308, 309, and 310 (correction torque-value calculating units), a limit processing unit 311, a band pass filter 312, a nonlinear gain amplifying unit 313 (correction torque-value amplifying unit), a limit processing unit 314, and an engine torque converting unit 315.

The regulator and tuning units 308, 309, and 310 apply a regulator processing to the quantities of state to be controlled, which were computed by the body vibration estimating unit 205. The units also multiply tuning gains for purposes of weighting, and adds the resulting values together to compute the correction torque value required for control. The regulator and tuning units 308, 309, and 310 have regulator gains and tuning gains corresponding to "quantities of state expressing sprung mass behavior based on torque input," "quantities of state expressing sprung mass behavior based on external disturbance," and "quantities of state expressing sprung mass behavior based on steering."

Figure 8:
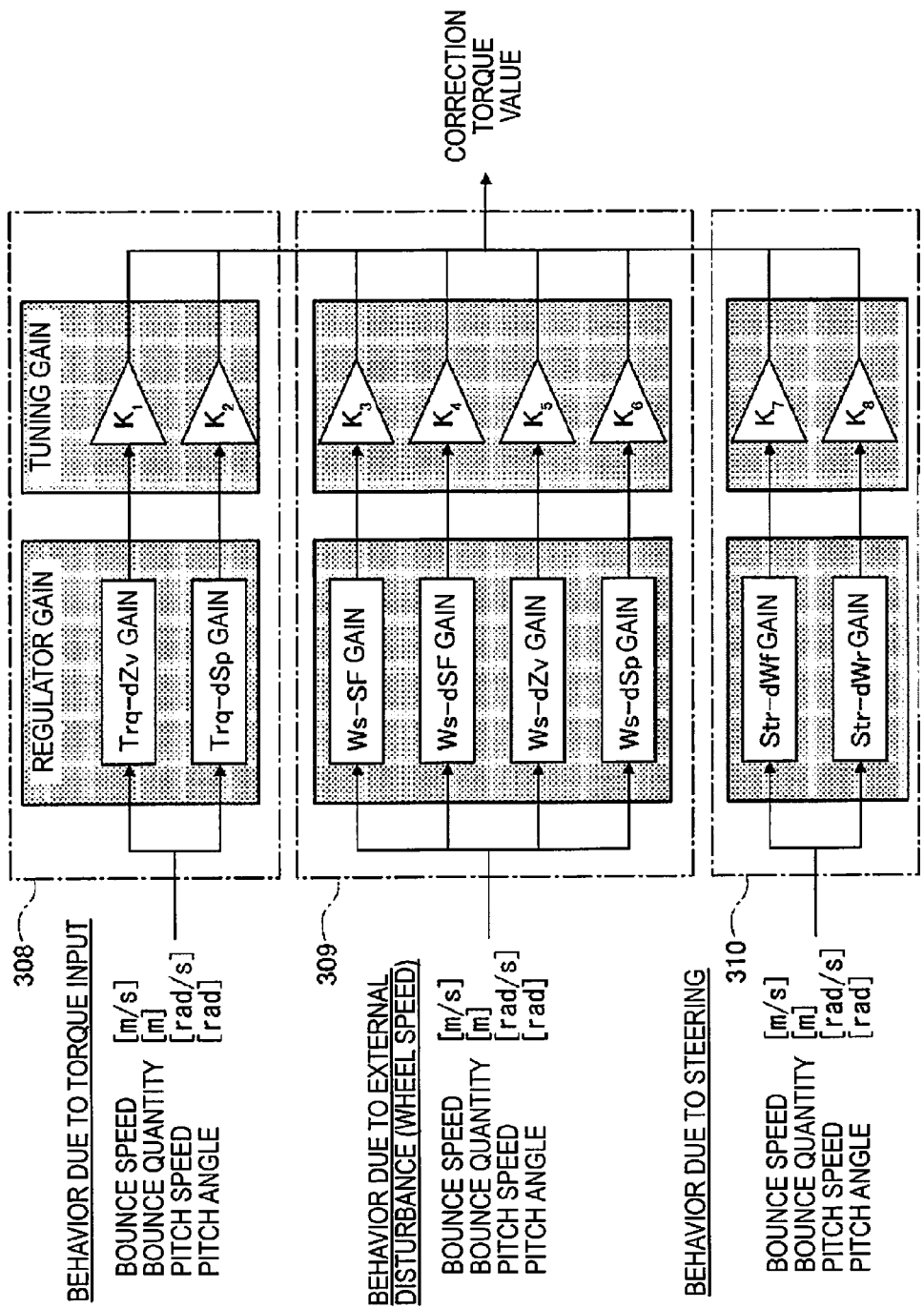
FIG. 8 is a gain block diagram showing the internal configuration of the regulator and tuning unit of Example 1.
Figure 9:
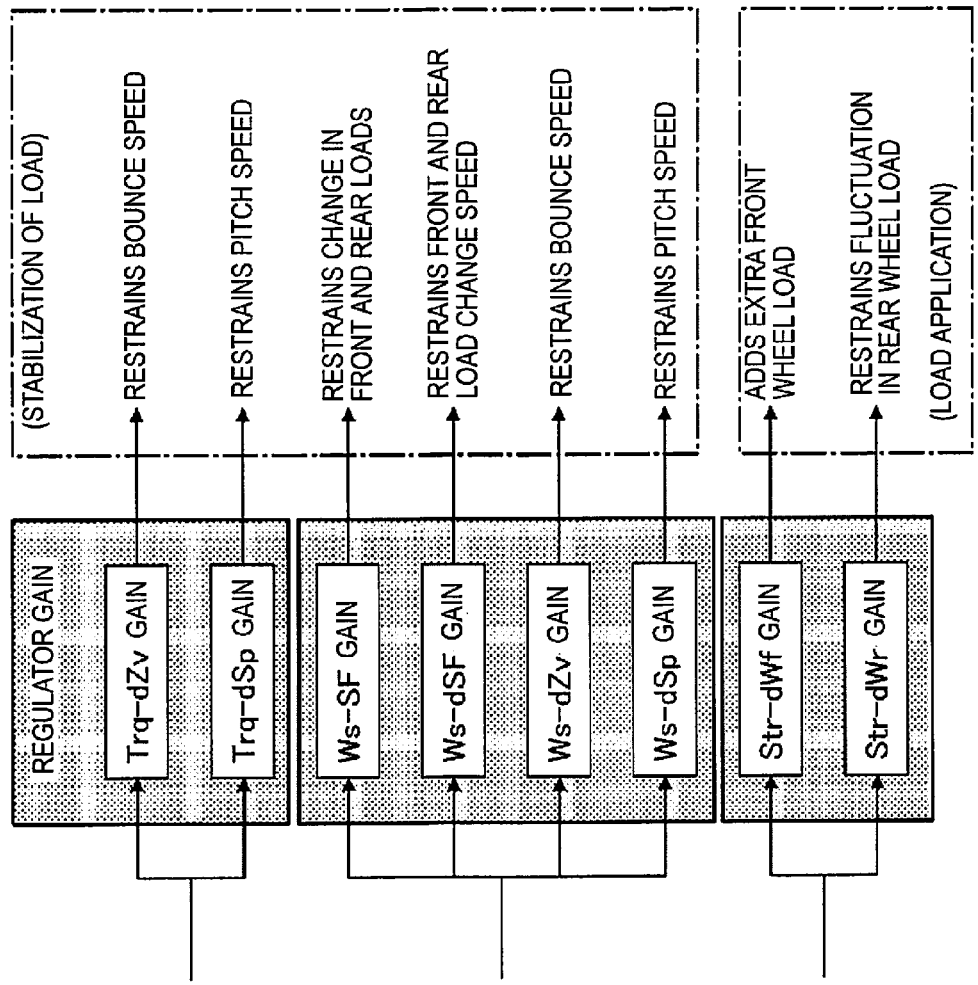
FIG. 9 is a schematic diagram of gain function showing the regulator gain function of the regulator and tuning unit of Example 1.

For the regulator gains, a Trq-dZv gain (bounce speed gain) and a Trq-dSp gain (pitch speed gain) are set as shown in FIG. 8 for "quantities of state expressing sprung mass behavior based on torque input." A Ws-SF gain (front and rear balance speed gain), a Ws-dSF gain (front and rear balance change speed gain), a Ws-dZv gain (bounce speed gain), and a Ws-dSp gain (pitch speed gain) are set as shown in FIG. 8 for "quantities of state expressing sprung mass behavior based on external disturbance." A Str-dWf gain (front wheel load change speed gain) and a Str-dWr gain (rear wheel load change speed gain) are set as shown in FIG. 8 for "quantities of state expressing sprung mass behavior based on steering." To describe the functions of these gains, as shown in FIG. 9, the regulator gains of the regulator and tuning units 308 and 309 contribute to load stabilization, and the regulator gains of the regulator and tuning unit 310 contribute to load application. The Trq-dZv gain restrains the bounce speed, and the Trq-dSp gain restrains the pitch speed. The Ws-SF gain restrains change in the front and rear loads, the Ws-dSF gain restrains the front and rear load change speed, the Ws-dZv gain restrains the bounce speed, and the Ws-dSp gain restrains the pitch speed. The Str-dWf gain adds extra front wheel load, and the Str-dWr gain restrains fluctuation in the rear wheel load. When values obtained by multiplying the regulator gains by the quantities of state are subtracted from the drive torque of the vehicle, the quantities of state move toward equilibrium (which here means in a direction which stops vibration). Therefore, values obtained by multiplying the negative regulator gains by the quantities of state serve as a correction torque value, which is added to the drive torque command value.

Tuning gains are set for each of the regulator gains. Specifically, as shown in FIG. 8, a tuning gain K1 is set for the Trq-dZv gain, a tuning gain K2 is set for the Trq-dSp gain, a tuning gain K3 is set for the Ws-SF gain, a tuning gain K4 is set for the Ws-dSF gain, a tuning gain K5 is set for the Ws-dZv gain, a tuning gain K6 is set for the Ws-dSp gain, a tuning gain K7 is set for the Str-dWf gain, and a tuning gain K8 is set for the Str-dWr gain. Because the drive torque fluctuates when corrected using regulator gains, in a case where a correction using regulator gains serves as a torque command value without modification, fluctuation between the front and rear gains may cause unease, and the targets of improved steering response and proactive control of roll behavior cannot be achieved. Therefore, the tuning gains K1-K6 are set to values which are in a positive direction restraining vibration, and fall in a range of front and rear gain fluctuation which does not cause unease. The tuning gains K7 and K8 are set to values which are in a negative direction fostering vibration, and fall in a range of front and rear gain fluctuation which does not cause unease. Applying a sum of values obtained by multiplying these tuning gains K1-K8 to a vehicle drive shaft can stabilize the front and rear wheel loads to fully achieve tire performance, and can add extra load to the front wheels during steering to improve steering response and achieve gentle rolling behavior. Because the tuning gains K1-K8 are adjustment allowances for weighting, the initial settings may be changed according to the vehicle to which the tuning gains are applied so as to correspond to the vehicle model. When the tuning gains K1-K8 are also made changeable during travel, the tuning gains K1-K8 can be suitably adjusted according to travel conditions, driver operating conditions, or the like to emphasize a particularly desirable control effect according to travel conditions or the like.

The limit processing unit 311 and the band pass filter 312 subject the correction torque value computed by the regulator and tuning units 308, 309, and 310 to limit processing and filter processing as a measure to counter drive system resonance. As a measure to counter drive system resonance, the limit processing unit 311 processes the sum of values obtained by multiplying the tuning gains K1-K8 (the correction torque value) to limit the maximum absolute value of the correction torque value, and limits this value to a torque value in a range in which the driver senses no fluctuation in front and rear gain. As a measure to counter drive system resonance similar to the limit processing unit 311, the band pass filter 312 extracts the sprung mass behavior of the vehicle body, and removes the component of the drive system resonance frequency so as to restrain the sprung mass vibration component. The reason for this countermeasure is that applying an unplanned vibration component to the drive torque in an actual vehicle, especially an engine-driven vehicle, interferes with the drive system resonance to create a vibration which causes unease. The countermeasure is also required because an engine-driven vehicle or the like has poor response to drive torque commands or has dead zones, and thus risks not fully achieving the anticipated control effect.

Figure 10:
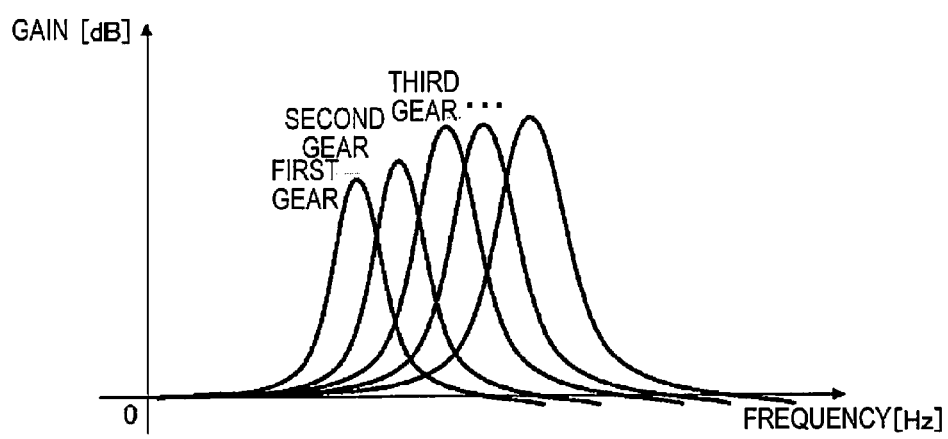
FIG. 10 is a characteristic diagram of the resonance frequency of the drive system, showing the different resonance frequency characteristics of the gears of a manual transmission in the description of the band pass filter of Example 1.
Figure 11:
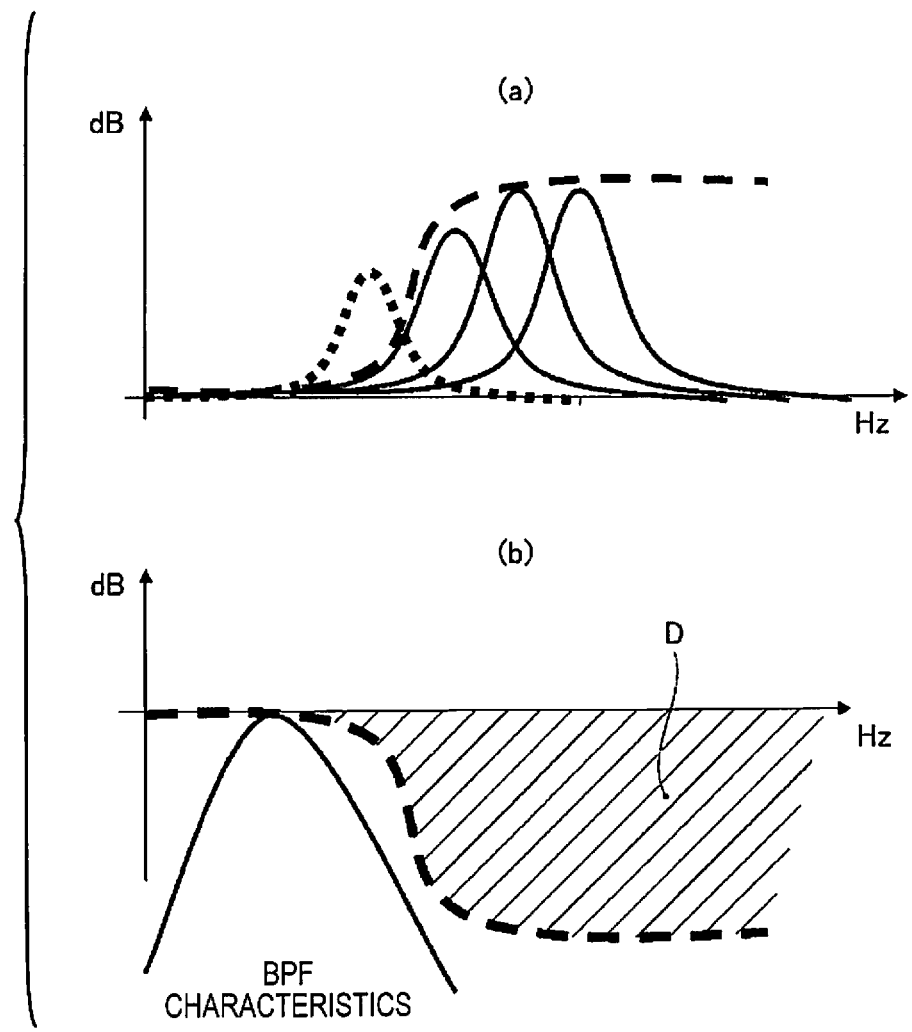
FIG. 11 is a graph showing (a) a graph connecting the apices of the drive system resonance frequency characteristics at a gear position set as a control operation gear in the description of the band pass filter of Example 1, and (b) an example of setting BPF characteristics to avoid interference with the resonance frequency characteristics of the drive system.

The setting method of the band pass filter 312 will be described hereinafter. The drive system resonance frequency usually differs depending on the gear of the manual transmission 107, and is a low frequency at a low gear and a higher resonance frequency at higher gears as shown in FIG. 10. The band pass filter 312 provided in this case is set so as to produce a gain of 0 dB in sprung mass resonance (usually close to 1-2 Hz). In a case where the resonance frequency at a low gear is close to the sprung mass resonance frequency of the vehicle body, control is interrupted when in this gear, and the drive torque is not corrected. For example, the drive torque is not corrected when first or second gear has been selected. The frequency characteristics of the band pass filter 312 (the BPF characteristics shown by the solid line in Part (b) of FIG. 11) are set so that a graph connecting the apices of the drive system resonance frequency characteristics at a gear position set as a control operation gear (for example, the third to fifth gears) (the enclosing dotted line in Part (a) of FIG. 11) does not interfere with the vertically inverted region at 0 dB (the region D shown by cross-hatching in FIG. 12).

By setting the band pass filter 312 in this way, even if the drive system resonance amplifies the command value, the band pass filter 312 has lowered the gain in advance, which produces an overall system gain of 0 dB and prevents greater vehicle behavior than the vehicle behavior limited by the limit processing unit 311 acting before the band pass filter 312.

Figure 12:
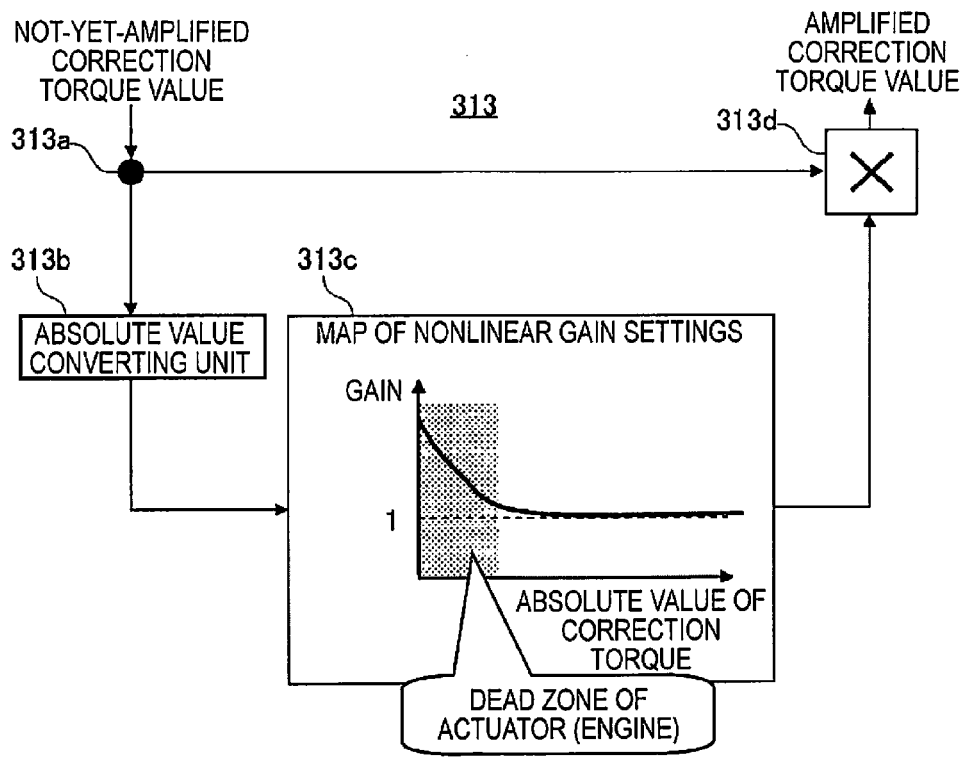
FIG. 12 is a block diagram showing a specific configuration of the nonlinear gain amplifying unit of Example 1.

As an actuator (engine 106) responsiveness measure, the nonlinear gain amplifying unit 313 processes the correction torque value outputted by the band pass filter 312 to amplify the correction torque value near the region where the positive or negative attribute of the correction torque value is reversed (=the dead zone region of the actuator). As shown in FIG. 12, the nonlinear gain amplifying unit 313 has a branching unit 313a, an absolute value converting unit 313b, a gain setting unit 313c, and a multiplying unit 313d. The branching unit 313a divides the correction torque value from the band pass filter 312 between the absolute value converting unit 313b and the multiplying unit 313d. The absolute value converting unit 313b converts the inputted correction torque value (=the not-yet-amplified correction torque value) to an absolute value.

The gain setting unit 313c sets a gain based on the absolute value of the inputted correction torque and a preset map of nonlinear gain. The multiplying unit 313d computes the amplified correction torque value according to the produce of the not-yet-amplified correction torque value and the gain from the gain setting unit 313c.

Figure 13:
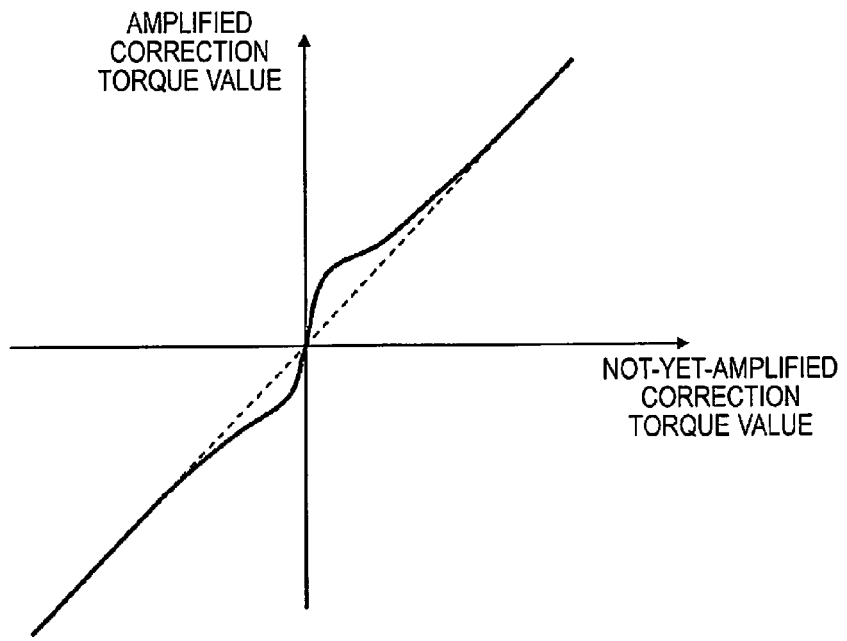
FIG. 13 is a relationship characteristic diagram of correction torque values, showing the relationship between the notyet-amplified correction torque value in the nonlinear gain amplifying unit of Example 1, and the amplified correction torque value.

Nonlinear gain is defined using a map in which the absolute value of the not-yet-amplified correction torque serves as an input, and the product of its output (gain) and the original not-yet-amplified correction torque value serves as the nonlinear-gain processed output. When the absolute value of the not-yet-amplified correction torque input is plotted on the horizontal axis and the gain to be multiplied is plotted on the vertical axis, the gain value on the nonlinear gain map reaches a peak at an input of 0, and gradually falls as the input increases from 0 in the dead zone region of the actuator. When the input is greater than the dead zone region of the actuator, the gain value is close to 1, and reaches a peak value of 1 (steady-state value) at even greater inputs (FIG. 12). As shown in FIG. 13, the relationship between the not-yet-amplified correction torque value and the amplified correction torque value in this "amplification processing near the region where the positive or negative attribute of the correction torque value is reversed due to nonlinear gain" is a monotonic increase relationship. In the region where the absolute value of the not-yet-amplified torque is high, the not-yet-amplified correction torque value=the amplified correction torque value.

The limit processing unit 314 subjects the amplified correction torque value outputted by the nonlinear gain amplifying unit 313 to a final limit processing.

The engine torque converting unit 315 converts the amplified correction torque value from the limit processing unit 314 to an engine end torque value according to the gear ratio, and outputs this value as the final correction torque value.

Next, the operation will be described. The operation of the vehicle body vibration-damping control device of Example 1 will be described divided into "Vehicle body vibration-damping control operation," "Basic operation of vehicle body vibration-damping control," and "Operation achieving vibration-damping effect in engine-driven vehicle."

Vehicle Body Vibration-Damping Control Operation

Figure 14:
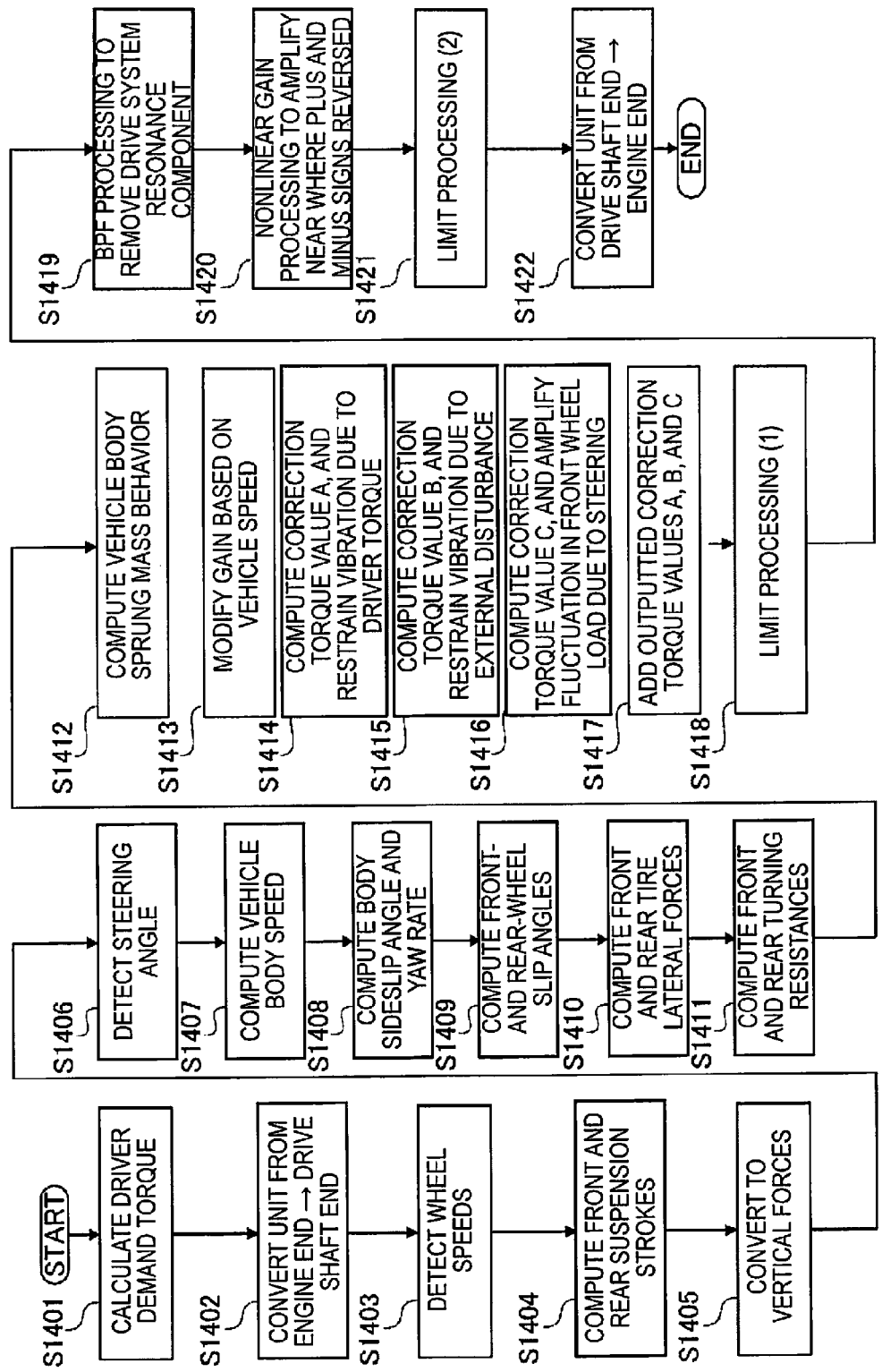
FIG. 14 is a flowchart showing the processing flow of vehicle body vibration-damping control executed in the engine control module of Example 1.
Figure 15:
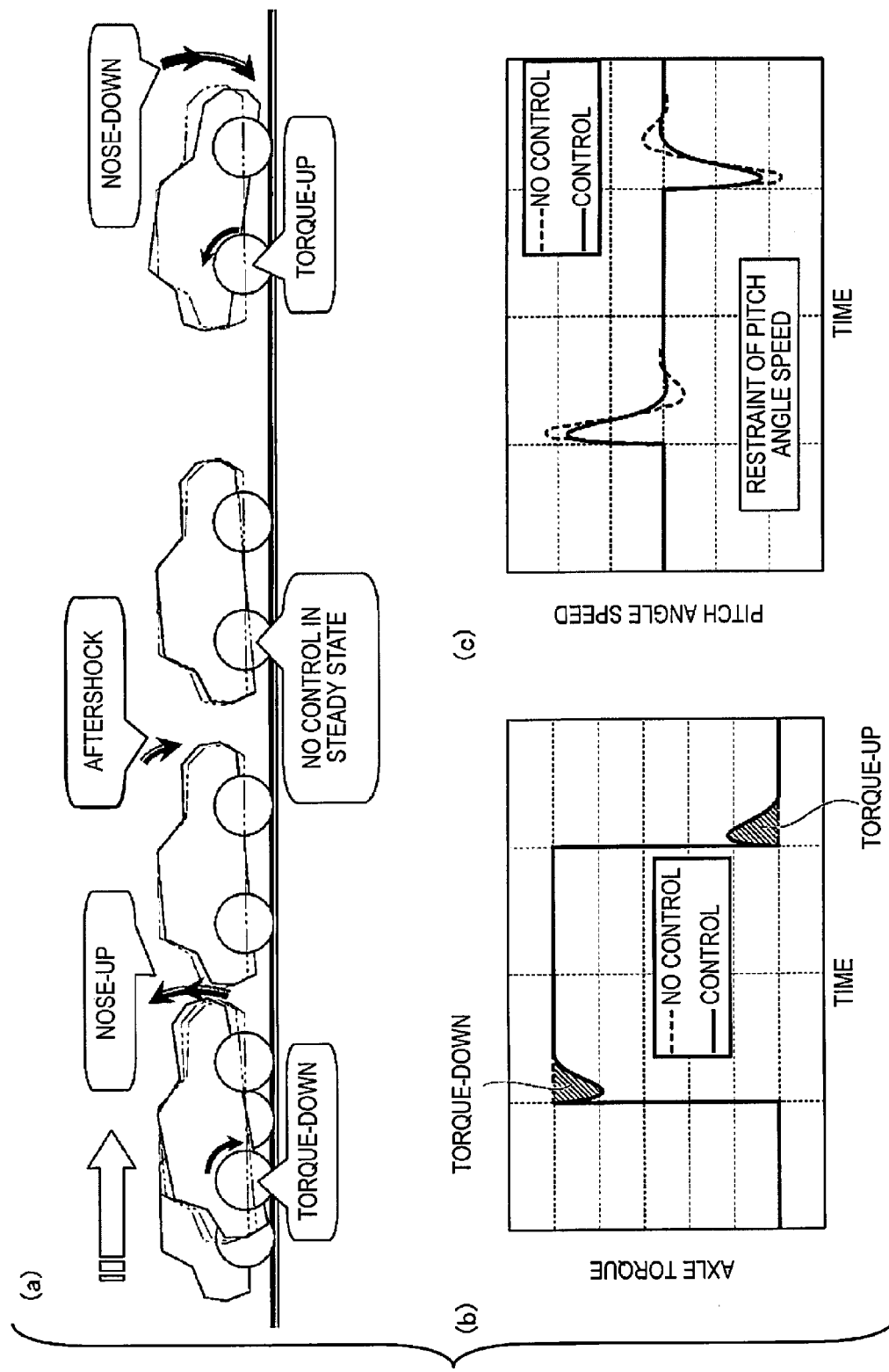
FIG. 15 is diagrams illustrating the basic operation of vehicle body vibration damping, showing (a) operating state, (b) a time chart of axle torque characteristics, and (c) a time chart of pitch angle velocity characteristics.

FIG. 14 is a flowchart showing the processing flow of vehicle body vibration-damping control executed in the engine control module 101 of Example 1. The vehicle body vibration-damping control operation will be described hereinafter based on the flowchart of FIG. 14.

During vehicle body vibration-damping processing, the processing flow from step S1401 to S1422 is executed in sequence at a predetermined control cycle. In step S1401 at the start of vehicle body vibration damping, the driver-demand torque calculating unit 201 calculates the driver demand torque. In the next step S1402, the drive torque converting unit 301 multiplies the gear ratio by the driver demand torque to convert the unit from an engine end torque to a shaft end torque Tw. In the next step S1403, the wheel speed sensors 103FR, 103FL, 103RR, and 103RL detect the wheel speeds. In the next step S1404, the suspension stroke computing unit 302 computes the stroke speed and the stroke quantity of the suspension based on the wheel speeds. In the next step S1405, the vertical force converting unit 303 converts the stroke speed and the stroke quantity of the suspension to front- and rear-wheel vertical forces Ff and Fr. In the next step S1406, the steering angle sensor 111 detects the steering angle. In the next step S1407, the body speed estimating unit 304 computes the vehicle body speed V. In the next step S1408, the turning behavior estimating unit 305 computes the yaw rate $\gamma$ and the body sideslip angle $\beta$. In the next step S1409, the turning resistance estimating unit 306 computes the front- and rear-wheel slip angles $\beta f$ and $\beta r$ (tire sideslip angles). In the next step S1410, the turning resistance estimating unit 306 computes the cornering forces Fyf and Fyr. In the next step S1411, the turning resistance estimating unit 306 computes the front- and rear-wheel turning resistances Fcf and Fcr. The processing up to this point is done within the input converting unit 204.

In the next step S1412, the body vibration estimating unit 205 computes quantities of state expressing the sprung mass behavior of the vehicle body. In the next step S1413, the tuning gains of the regulator and tuning units 308, 309, and 310 are modified based on, for example, the vehicle speed. In the next step S1414, the regulator and tuning unit 308 computes a correction torque value A for restraining vibration due to the driver torque. In the next step S1415, the regulator and tuning unit 309 computes a correction torque value B for restraining vibration due to external disturbance. In the next step S1416, the regulator and tuning unit 310 computes a correction torque value C for amplifying fluctuation in front and rear loads due to steering. In the next step S1417, a correction torque value is outputted according to the sum of the correction torque value A, the correction torque value B, and the correction torque value C.

In the next step S1418, the limit processing unit 311 subjects the correction torque value to a limit processing as a measure to counter the drive system resonance. In the next step S1419, the band pass filter 312 subjects the correction torque value to filter processing for removing the drive system resonance component. In the next step S1420, the nonlinear gain amplifying unit 313 subjects the correction torque value to a nonlinear gain processing for amplifying the value in the region where the positive or negative attribute is reversed. In the next step S1421, the limit processing unit 314 subjects the amplified correction torque value to a final limit processing. In the next step S1422, the engine torque converting unit 315 converts the unit of the shaft end correction torque value to an engine end correction torque value, and outputs this value as the final correction torque value. This processing is repeated in each control cycle.

As a result, the drive torque command value outputted to the engine 106 achieves improved steering response by stabilizing change in load during travel, correcting by a correction torque value which adds an extra load on the front wheels during steering, stabilizing fluctuation in the front and rear loads, and deliberately, applying wheel loads on the left and right front wheels 102FR and 102FL during steering.

Basic Operation of Vehicle Body Vibration-Damping Control

What specific mechanism will control the sprung mass behavior of a vehicle body when damping vehicle-body vibration by the drive torque must be ascertained in advance. The basic operation of a vehicle body vibration-damping control which reflects this will be described hereinafter based on FIGS. 15-19.

First, the vehicle body vibration-damping control targets restraining the speed of change in vehicle body behavior due to fluctuation in torque or external disturbance by correcting the engine torque, stabilizing the load, and improving turning performance. The case of starting and accelerating from a stop, then traveling at a constant speed, and subsequently decelerating to a stop as shown in Part (a) of FIG. 15 will be taken as an example of specific travel conditions.

When a vehicle is started from a stop and accelerated, a rapid increase in the drive torque causes a load shift in which the wheel load on the rear wheels increases and the wheel load on the front wheels decreases, producing a nose-up vehicle body behavior in which the front of the vehicle body rises. As shown in Parts (a) and (b) of FIG. 15, bringing down the drive torque to the rear wheels, which are the drive wheels, produces a nose-down behavior in which the front of the vehicle body drops as when decelerating. The nose-up due to the load shift cancels out the nose-down due to torque-down, stabilizing the vehicle body behavior. Because traveling at a constant speed after starting stabilizes the vehicle body behavior in a steady state, no control is exercised to correct the drive torque. Subsequently, in a case where the vehicle decelerates due to brake operation or the like, a rapid decrease in the drive torque causes a load shift in which the wheel load on the rear wheels decreases and the wheel load on the front wheels increases, producing a nose-down vehicle body behavior in which the front of the vehicle body drops. As shown in Parts (a) and (b) of FIG. 15, bringing up the drive torque to the rear wheels, which are the drive wheels, produces a nose-up behavior in which the front of the vehicle body rises as when accelerating. The nose-down due to the load shift cancels out the nose-up due to torque-up, stabilizing the vehicle body behavior. Therefore, when change in the pitch angle speed of the vehicle body is considered, as shown in Part (c) of FIG. 15, vibration damping restrains the pitch angle speed of the vehicle body to a lower speed compared to no vibration damping.

Improvement of performance by the vehicle body vibration-damping control of the present application has the following target scenarios and effects:

(a) Gentle rolling and good linearity gives a stable-feeling linear turning performance in scenarios such as changing lanes or driving on a curving road; and (b) Little need to correct steering and good pitch damping gives stable vehicle cruising performance in scenarios such as when cruising at high speed.

Achieving (a) requires "improved steering response" and "restraint of roll speed," and achieving (b) requires "restraint of load fluctuation." The reason that these effects can be achieved will be described hereinafter based on FIGS. 16-19.

Figure 16:
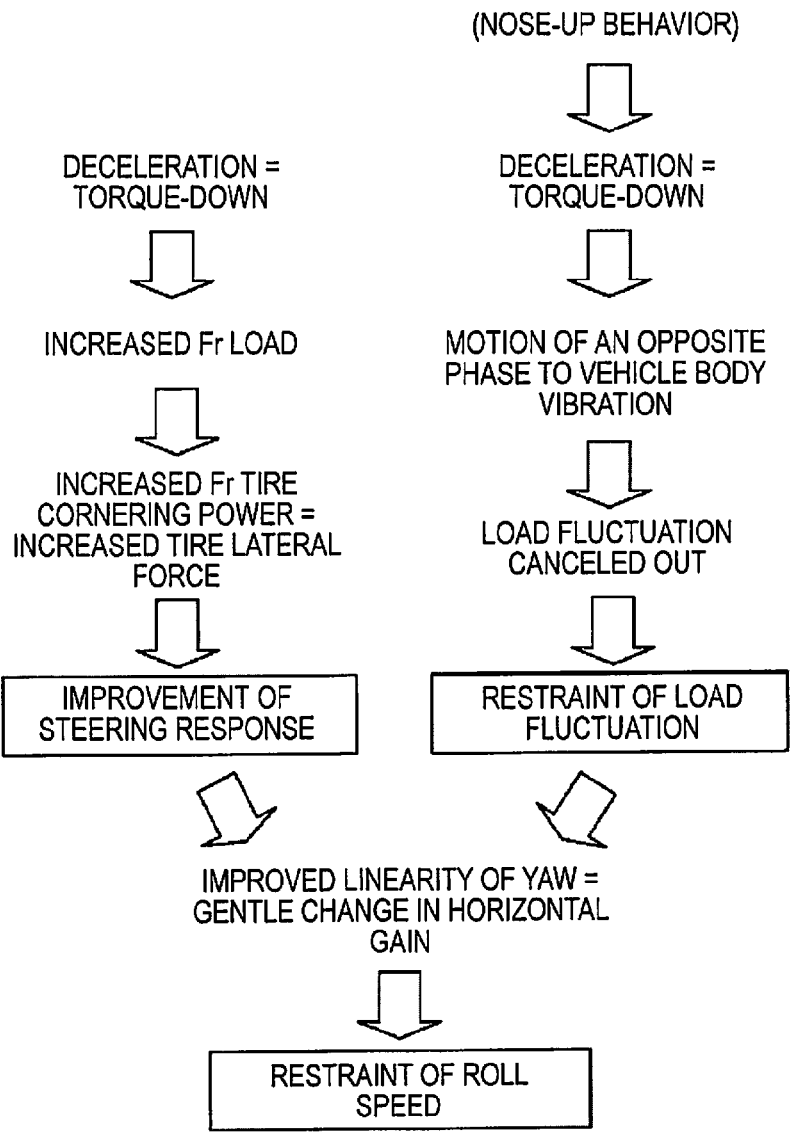
FIG. 16 is a principle diagram illustrating the basic principles of "improvement of steering response," "restraint of load fluctuation," and "restraint of roll velocity," which are effects targeted by the vehicle body vibration-damping control of Example 1.
Figure 17:
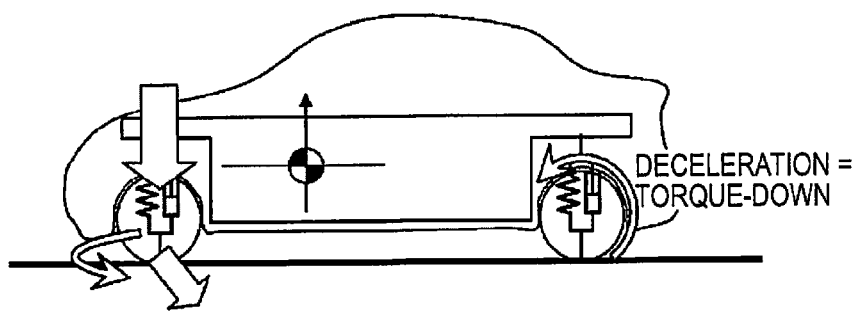
FIG. 17 is a diagram showing the effect of "improvement of steering response," which is an effect targeted by the vehicle body vibration-damping control of Example 1.

Regarding "improved steering response," as shown in FIGS. 16 and 17, decelerating=torque-down during steering improves steering response by increasing the front wheel load, which increases the cornering power Cp of the front wheel tires and the lateral force on the tires. Specifically, "improved steering response" is achieved by increasing the wheel load during steering, using the dependency that the greater the wheel load, the greater the cornering power Cp.

Figure 18:
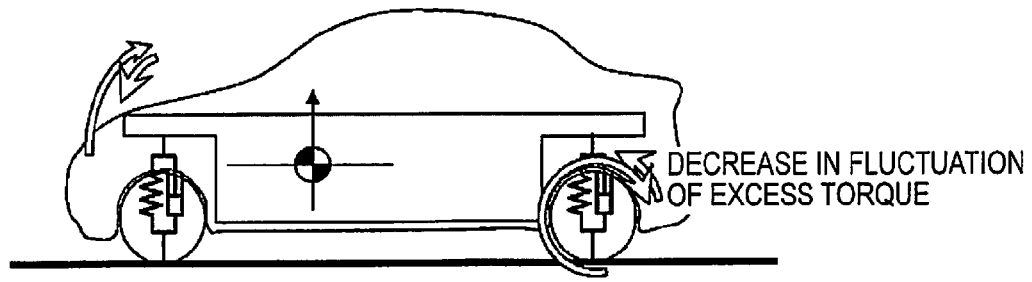
FIG. 18 is a diagram showing the effect of "restraint of load fluctuation" due to driver input, which is an effect targeted by the vehicle body vibration-damping control of Example 1.
Figure 19:
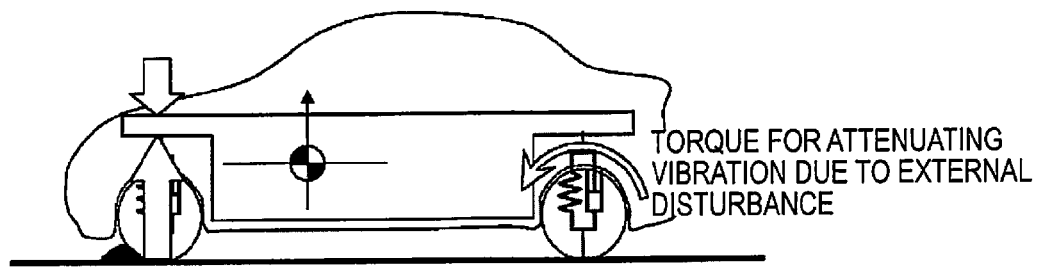
FIG. 19 is a diagram showing the effect of "restraint of load fluctuation" due to inputted road surface disturbance, which is an effect targeted by the vehicle body vibration-damping control of Example 1.

Regarding "restraint of load fluctuation," as shown in FIG. 16, in a case where nose-up behavior has occurred, for example, decelerating=torque-down restrains load fluctuation by causing a motion (nose-down) of an opposite phase to the vehicle body vibration, which cancels out load fluctuation. In a case where a nose-down behavior occurs, accelerating=torque-up restrains load fluctuation by causing a motion (nose-up) of an opposite phase to the vehicle body vibration, which cancels out load fluctuation. Load fluctuation is restrained even in a case where a driver input causes vibration (load fluctuation) as shown in FIG. 18, or a road surface disturbance causes vibration (load fluctuation) as shown in FIG. 19. That is, when a pitch behavior due to fluctuation in torque or a road surface disturbance is estimated, "restraint of load fluctuation" is achieved by a drive torque of an opposite phase to the estimated pitch behavior.

Regarding "restraint of roll speed," the "improvement of steering response" and "restraint of load fluctuation" improves the linearity of the yaw rate. Therefore, a gentle change in horizontal gain occurs proportionally to the yaw rate, lowering the peak value of the roll rate and restraining the roll speed. That is, restraint of roll speed" is achieved by combining "improvement of steering response" and "restraint of load fluctuation."

Thus, damping of vehicle body vibration is controlled by dividing the causes of vehicle body vibration between vibration caused by steering and vibration caused by other causes. Therefore, deliberately fostering a nose-down behavior so as to increase the front wheel load during steering improves yaw response, and simultaneously restraining excess vibration components ensures linearity. Performing these control actions simultaneously also restrains sudden change in horizontal gain, and thus can achieve the targeted effect (a) of the present control of restraining the roll rate. When a vehicle is cruising on a straight road, estimating the fluctuation in torque and the pitch behavior due to road surface disturbance and applying a drive torque of an opposite phase to the estimated pitch behavior restrains load fluctuation, which can achieve the targeted effect (b) of the present control of obtaining stable vehicle cruising performance.

Operation Achieving Vibration-Damping Effect in Engine-Driven Vehicle

To achieve the targeted effects, there is ideally no delay in the response of the actual drive torque to the drive torque command value. Actuators differ, however, in responsiveness and dead zone characteristics depending on the type, model, and the like, and achieving the targeted effects requires fashioning to handle differences in actuator characteristics. The operation for achieving a vibration-damping effect in an engine-driven vehicle, which reflects this, will be described hereinafter.

An engine (internal combustion engine), in particular, has dead zones and delayed response in terms of controlling the sprung mass vibration of a vehicle body due to drive torque, making it difficult to achieve the targeted effects without modification. Although phase advance processing by a filter constitutes means of solving delayed response, in a case where phase advance processing is employed, a high frequency component is amplified and greatly changes the waveform of the control command value. This results in interfering with the drive system resonance. Moreover, phase advance processing by a filter cannot solve dead zone and precision problems.

Therefore, in Example 1, the degree of correction of the correction torque value is amplified in the region where the positive or negative attribute of this value is reversed, and the amplified correction torque value is employed in the configuration for correcting the drive torque command value. Specifically, the region where the positive or negative attribute of the correction torque value is reversed is a region where the actuator response is delayed, or a dead zone region. Taking note of this region and amplifying the absolute value of the correction torque in the region where the positive or negative attribute is reversed—that is, increasing the amount of correction for either a plus or minus correction torque value—expands the operation region where the engine 106, which is the actuator, operates with respect to the applied drive torque command value. This decreases the non-operation region of the engine 106 in association with this expansion of the operation region of the engine 106. The decrease in the non-operating region increases the output responsiveness of the actual drive torque response to the drive torque command value. When the actual drive torque starts to respond to the drive torque command value, a configuration is employed in subsequent torque regions in which the correction torque value is outputted without modification. This configuration, unlike phase advance processing by a filter, damps vehicle body vibration without changing the overall control frequency characteristics.

Applying the vehicle body vibration-damping control of Example 1 in this way can achieve the targeted effect of restraining the roll rate even in an engine-driven vehicle or the like having poor responsiveness and many dead zones, and can prevent vibration due to the drive system resonance. Needless to say, the concurrent effect of restraining vibration during travel can also simultaneously achieve improved riding comfort.

Figure 20:
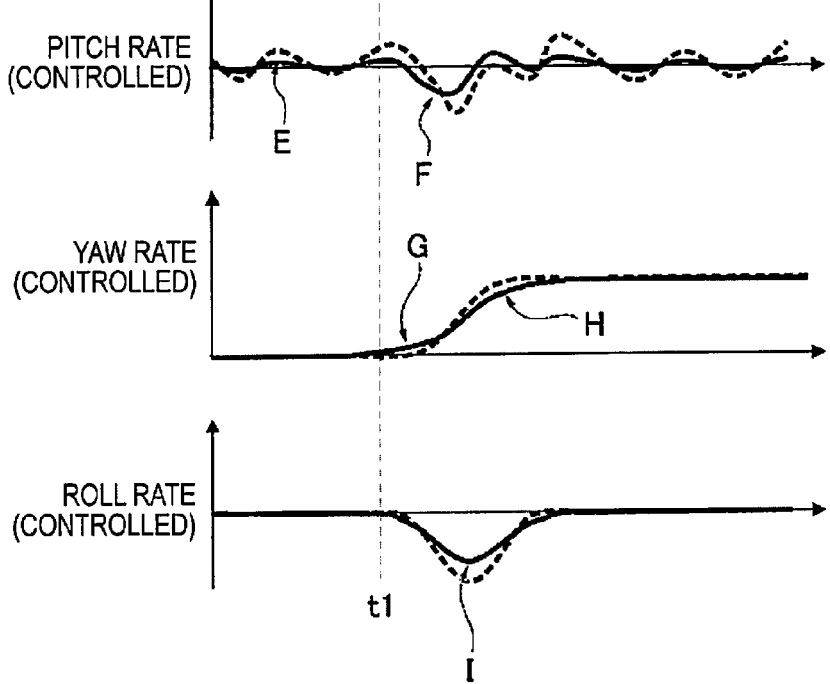
FIG. 20 is a time chart showing characteristics of pitch rate (uncontrolled), steering input, control command value (=drive torque command value), pitch rate, yaw rate, and roll rate, which express effects achieved during steering of an engine-driven vehicle provided with the vehicle body vibration-damping control device of Example 1.

FIG. 20 is a time chart representing by a time series various characteristics during steering after traveling straight. The effects of vehicle body vibration-damping control will be described based on FIG. 20. During vehicle body vibration-damping control, a control command value (=drive torque command value) obtained from (command torque for damping vehicle body vibration)+(command torque for controlling steering response) is outputted as indicated by arrow J in FIG. 20. Therefore, in the straight travel region until time t1, as indicated by arrow E in FIG. 20, the pitch rate is restrained compared to no control, and the resulting stable travel performance of the vehicle achieves improved riding comfort. In the transitional steering region starting from time t1, as indicated by arrow F in FIG. 20, change in the pitch rate is restrained, and a suitable load shift is achieved. During initial turning within the transitional steering region, as indicated by arrow G in FIG. 20, the yaw rate initially rises compared to no control, and initial responsiveness is improved. During later turning within the transitional steering region, as indicated by arrow H in FIG. 20, the yaw rate changes gently, restraining counter-productive turning. In the transitional steering region (initial to later steering), simultaneously controlling to restrain change in the pitch rate and to restrain change in the yaw rate restrains sudden change in horizontal gain, and thus restrains the roll rate compared to no control, as indicated by arrow I in FIG. 20.

Next, the effects will be described. The vehicle body vibration-damping control device of Example 1 can obtain the following effects.

(1) In a vehicle body vibration-damping control device provided with a body vibration estimating unit 205 for estimating a sprung mass behavior of a vehicle body based on input information during travel, and a torque command-value computing unit 206 for computing a correction torque value for correcting a drive torque command value applied to an actuator (engine 106) when the sprung mass behavior is controlled, the torque command-value computing unit 206 has a correction torque-value calculating unit (regulator and tuning units 308, 309, and 310) for calculating a correction torque value based on the result of estimating the sprung mass behavior, and a correction torque-value amplifying unit (nonlinear gain amplifying unit 313) for amplifying the absolute value of the correction torque when in a region where the positive or negative attribute of the calculated correction torque value is reversed, and using the amplified value to correct the drive torque command value. As a result, a targeted effect for damping the vehicle body vibration can be achieved regardless of the responsiveness of an actuator (engine 106) for controlling the drive torque. The "region where the positive or negative attribute of the calculated correction torque value is reversed" is called a region where the actuator response is delayed, or a dead zone region.

(2) The body vibration estimating unit 206 has a vehicle model 307, and makes estimates divided into a sprung mass behavior based on the steering input (front- and rear-wheel turning resistances Fcf and Fcr) for the vehicle model 307, and a sprung mass behavior based on inputs other than the steering input (shaft end torque Tw and front- and rear-wheel vertical forces Ff and Fr), and the correction torque-value calculating unit (regulator and tuning units 308, 309, and 310) calculates a correction torque value for controlling a load based on the sprung mass behaviors estimated by the body vibration estimating unit 206 (FIG. 9). As a result, besides the effects of (1), steering stability is achieved by restraining the roll rate during turning, and behavior stability is achieved by restraining the pitch rate during straight travel.

(3) The correction torque-value amplifying unit (nonlinear gain amplifying unit 313) amplifies the absolute value of the correction torque in an actuator resolution dead zone region on either side of a location where the positive or negative attribute of the not-yet-amplified correction torque value calculated by the correction torque-value calculating unit (regulator and tuning units 308, 309, and 310) is reversed (FIG. 12). As a result, besides the effects of (1) or (2), an effect can be achieved controlling an actuator resolution dead zone region, which has been rendered ineffective, by amplifying a drive torque command value that has dissipated in the dead zone.

(4) The correction torque-value calculating unit (nonlinear gain amplifying unit 313) amplifies the absolute value of the correction torque while maintaining a monotonic increase relationship with respect to the not-yet-amplified correction torque value (FIG. 13). As a result, besides the effects of (3), a control effect reflecting the calculation result by the correction torque-value calculating unit (regulator and tuning units 308, 309, and 310) is achieved. For example, if only a part of a value is extremely amplified during amplification near where the positive or negative attribute is reversed, there is a risk that the calculation result by the correction torque-value calculating unit (regulator and tuning units 308, 309, and 310) will cause a completely unexpected acceleration, deceleration, or the like.

(5) The correction torque-value amplifying unit (nonlinear gain amplifying unit 313) amplifies according to the product of the absolute value of the not-yet-amplified correction torque, and a nonlinear gain that changes according to the absolute value of the not-yet-amplified correction torque (multiplying unit 313$d$ in FIG. 12). As a result, besides the effects of (3) or (4), the correction torque value can be amplified using a nonlinear gain having a high degree of freedom for setting the gain (amplification rate).

(6) The nonlinear gain is applied by a map or a function in which the absolute value of the not-yet-amplified correction torque serves as an input (gain setting unit 313$c$ in FIG. 12). As a result, besides the effects of (5), the gain (amplification rate) can be determined by a simple process for inputting the absolute value of the not-yet-amplified correction torque.

(7) The nonlinear gain takes on a gain value of 1 when in a region apart from the region where the positive or negative attribute of the not-yet-amplified correction torque value is reversed (gain setting unit 313$c$ in FIG. 12). As a result, besides the effects of (5) or (6), the gain (amplification rate) can be determined as a value for achieving a control effect without changing the overall control frequency characteristics.

(8) The correction torque-value amplifying unit (nonlinear gain amplifying unit 313) determines the amplified correction torque value using a map or a function in which the not-yet-amplified correction torque value serves as an input (FIG. 12). As a result, besides the effects of (3)-(7), an amplified correction torque value can be determined by a simple process for inputting the absolute value of the not-yet-amplified correction torque.

(9) The amplified correction torque value is the same value as the not-yet-amplified correction torque value when in a region apart from the region where the positive or negative attribute of the not-yet-amplified correction torque value is reversed (FIG. 12). As a result, besides the effects of (8), the amplified correction torque value can be determined as a value for achieving a control effect without changing the overall control frequency characteristics.

(10) In a case where the correction torque value is calculated using an actuator end torque of the end of the actuator, the actuator resolution dead zone region is the range of width to the minimum torque command value to which the actuator can respond. As a result, besides the effects of (3)-(9), the dead zone region for amplifying the correction torque value can be set accurately in a case where the drive torque is controlled based on the actuator end.

(11) In a case where the correction torque value is calculated using a shaft end torque of the end of a drive shaft, the actuator resolution dead zone region is the range of width to the minimum torque command value to which the shaft end torque responds. As a result, besides the effects of (3)-(9), the dead zone region for amplifying the correction torque value can be set accurately in a case where the drive torque is controlled based on the drive shaft end.

(12) The actuator is an internal combustion engine (engine 106) for generating a drive torque of a vehicle. As a result, besides the effects of (3)-(9), a targeted effect for damping vehicle body vibration can be achieved despite the actuator for controlling the drive torque being an internal combustion engine (engine 106) having low response and dead zones. Specifically, the device of the present invention is effective in an engine-driven vehicle housing the engine 106 having low response and dead zones as an actuator.

Although the vehicle body vibration-damping control device of the present invention has been described based on Example 1, the specific configuration is not limited to this Example 1, and various design modifications or additions may be possible without departing from the scope of the inventions according to the claims.

Figure 21:
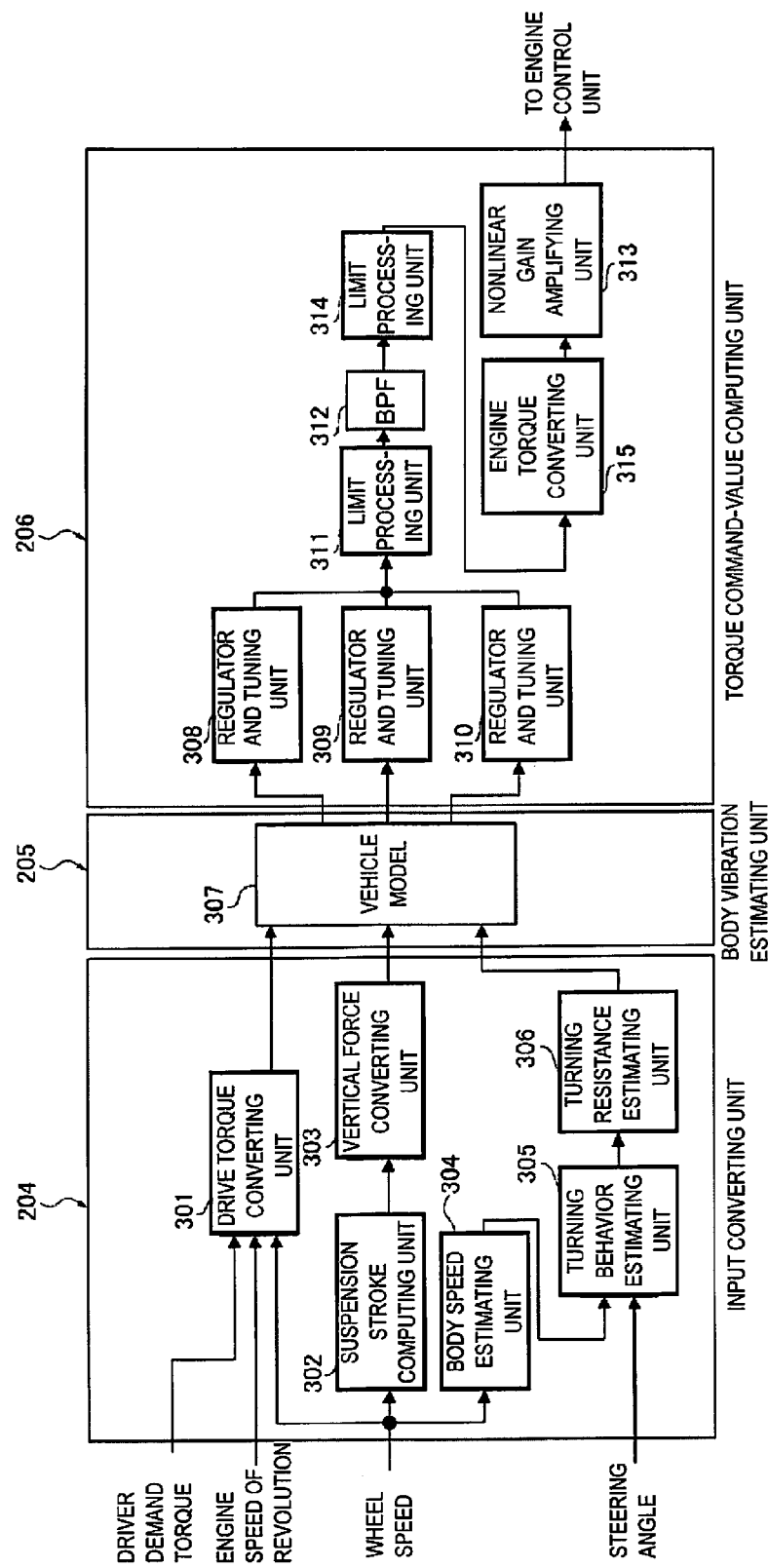
FIG. 21 is a control block diagram showing the vehicle body vibration-damping control device in an engine control module according to another example.

In Example 1, the nonlinear gain amplifying unit 313→limit processing unit 314→engine torque converting unit 315 were arranged after the band pass filter 312, and an example was shown of amplification processing using a nonlinear gain before processing to convert the gear ratio. As shown in FIG. 21, however, the limit processing unit 314→engine torque converting unit 315→nonlinear gain amplifying unit 313 (correction torque-value calculating unit) may be arranged after the band pass filter 312, and amplification processing using a nonlinear gain may be carried out after processing to convert the gear ratio. Amplification processing using a nonlinear gain is carried out after processing to convert the gear ratio when there is a possibility that a raised torque amplification component will be buried in an engine torque dead zone associated with converting the gear ratio. The raised torque amplification component due to nonlinear gain in the example shown in FIG. 21 is at or below the limiter of the lowest operating gear.

In Example 1, an example was indicated in which the actuator was the engine 106. The actuator used, however, may be any kind provided that it is provided with a drive system, such as a continuously variable transmission or a friction clutch, and a motor as a power source, and the drive torque transmitted to the drive wheels can be controlled by an external command.

In Example 1, an example was indicated in which the vehicle model 307 was used as the body vibration estimating unit 205 to estimate the sprung mass behavior of a vehicle body. The body vibration estimating unit, however, may be an example using one or a plurality of equations of motion per vehicle model.

In Example 1, an example was indicated in which the correction torque-value amplifying unit was the nonlinear gain amplifying unit 313, in which nonlinear gain characteristics are used to acquire an amplified correction torque value. The correction torque-value amplifying unit, however, may be an example in which an amplified correction torque value is acquired using an arithmetic expression corresponding to nonlinear gain characteristics.

In Example 1, an example of the body vibration estimating unit 206 was indicated in which estimates were made divided into a sprung mass behavior based on the steering input (front- and rear-wheel turning resistances Fcf and Fcr) for the vehicle model 307, and a sprung mass behavior based on inputs other than the steering input (shaft end torque Tw and front- and rear-wheel vertical forces Ff and Fr). The body vibration estimating unit need not estimate sprung mass behavior based on the steering input, and may be a unit which estimates sprung mass behavior for the driver input and the external disturbance input.

In Example 1, an example was indicated in which the vehicle body vibration-damping control device was applied to an engine-driven vehicle. The vehicle body vibration-damping control device, however, may be applied to a hybrid vehicle, an electric automobile, or the like by modifying the degree of amplification of the correction torque value to correspond to the responsiveness. In the case of a hybrid vehicle, the degree of amplification of the correction torque value may be switched between an engine travel mode and a motor travel mode having different actuators (power sources).

The invention claimed is:

1. A vehicle body vibration-damping control device comprising:
a body vibration estimating unit programmed to estimate a sprung mass behavior of a vehicle body based on input information during travel; and
a torque command-value computing unit programmed to compute a calculated correction torque value for correcting a drive torque command value applied to an actuator when the sprung mass behavior is controlled,
the torque command-value computing unit being further programmed to include a correction torque-value calculating unit programmed to calculate the calculated correction torque value based on a result of estimating the sprung mass behavior, and a correction torque-value amplifying unit programmed to amplify an absolute value of the calculated correction torque value to obtain an amplified value in a time period during which a positive attribute or a negative attribute of the calculated correction torque value is reversed, and being further programmed to use the amplified value to correct the drive torque command value.

2. The vehicle body vibration-damping control device according to claim 1, wherein
the body vibration estimating unit is programmed to divide sprung mass behavior estimates into a sprung mass behavior based on a steering input for a vehicle model, and a sprung mass behavior based on an input other than the steering input; and
the correction torque-value calculating unit is programmed to calculate the calculated correction torque value for controlling a load based on the sprung mass behaviors estimated by the body vibration estimating unit.

3. The vehicle body vibration-damping control device according to claim 1, wherein
the correction torque-value amplifying unit is programmed to amplify the absolute value of the correction torque in an actuator resolution dead zone region, the dead zone region being a time period during which the actuator response is delayed, on either side of a location where a positive attribute or a negative attribute of a not-yet-amplified correction torque value calculated by the correction torque-value calculating unit is reversed.

4. The vehicle body vibration-damping control device according to claim 3, wherein
the correction torque-value calculating unit is programmed to amplify the absolute value of the calculated correction torque and being programmed to maintain a monotonic increase relationship with respect to the not-yet-amplified correction torque value.

5. The vehicle body vibration-damping control device according claim 3, wherein
the correction torque-value amplifying unit is programmed to amplify based on a product of the absolute value of the not-yet-amplified correction torque, and based on a nonlinear gain that changes according to the absolute value of the not-yet-amplified correction torque.

6. The vehicle body vibration-damping control device according to claim 5, wherein
the correction torque-value amplifying unit is programmed to apply the nonlinear gain by a map or a function in which the absolute value of the not-yet-amplified correction torque serves as an input.

7. The vehicle body vibration-damping control device according to claim 6, wherein
the correction torque-value amplifying unit is programmed to apply to the nonlinear gain a gain value of 1 during a time period when the sign of the not-yet-amplified correction torque value is not reversed.

8. The vehicle body vibration-damping control device according to claim 3, wherein
the correction torque-value amplifying unit is programmed to determine the amplified correction torque value using a map or a function in which the not-yet-amplified correction torque value serves as an input.

9. The vehicle body vibration-damping control device according to claim 8, wherein
the amplified correction torque value is the same value as the not-yet-amplified correction torque value during a time period when the sign of the not-yet-amplified correction torque value is not reversed.

10. The vehicle body vibration-damping control device according to claim 3, wherein
the actuator resolution dead zone region is a time period during which the actuator can respond to a minimum torque command value in the event that the correction torque value is calculated using an actuator end torque of the end of the actuator.

11. The vehicle body vibration-damping control device according to claim 3, wherein
the actuator resolution dead zone region is a time period during which the end of the drive shaft torque responds to a minimum torque command value in the event that the calculated correction torque value is calculated using a drive shaft end torque of an end of a drive shaft.

12. The vehicle body vibration-damping control device according to claim 1, wherein
the actuator is an internal combustion engine configured to generate a drive torque of a vehicle.

* * * * *